United States Patent [19]
Gray et al.

[11] Patent Number: 6,094,676
[45] Date of Patent: Jul. 25, 2000

[54] METHOD AND APPARATUS FOR PEER-TO-PEER COMMUNICATION

[75] Inventors: Matthew H. Gray; John K. Hile; Robert D. Everett, Jr.; Jeffery F. Beamsley, all of Monroe, Mich.; John C. Masters, Oregon, Ohio

[73] Assignee: Hilgraeve Incorporated, Monroe, Mich.

[21] Appl. No.: 08/866,136

[22] Filed: May 30, 1997

[51] Int. Cl.[7] ........................................ G06F 13/00
[52] U.S. Cl. ........................................ 709/217
[58] Field of Search ............................ 709/200, 201, 709/203, 204, 205, 217, 218, 219, 220

[56] References Cited

U.S. PATENT DOCUMENTS

| | | | |
|---|---|---|---|
| 5,392,454 | 2/1995 | Kowal et al. | 455/32 |
| 5,642,350 | 6/1997 | Dailey | 370/85.2 |
| 5,761,421 | 6/1998 | Van Hoff et al. | 709/200 |
| 5,790,553 | 8/1998 | Deaton, Jr. et al. | 370/466 |
| 5,862,202 | 1/1999 | Bashoura et al. | 379/100.14 |

*Primary Examiner*—Moustafa M. Meky
*Attorney, Agent, or Firm*—Harness, Dickey & Pierce, P.L.C.

[57] ABSTRACT

Peer-to-peer communication is established between two remote computing units over a network channel, even though a permanent network address is not known. An originating computer sends a message over a monitor channel, such as a circuit-switched telephone line, to a receiving computer creating a triggering event. In response to the triggering event, either the originating computer or the receiving computer determines a network address associated with either the originating computer or the receiving computer. Then, using the network address, peer-to-peer communication between the originating computer and receiving computer is established over the network channel.

19 Claims, 8 Drawing Sheets

METHOD AND APPARATUS FOR PEER-TO-PEER COMMUNICATION

BACKGROUND OF THE INVENTION

1. Technical Field

The present invention relates generally to computer communication, and more particularly to establishing peer-to-peer communication between computers using dynamic network addresses to access a network channel.

2. Discussion

The Internet provides a means for establishing a communication link between two remote computers. A peer-to-peer or one-to-one connection between remote computers allows these computer users to conduct a conversation, exchange files, or participate in real-time gaming. However, establishing peer-to-peer communication with someone through the Internet is at best inconvenient.

In the past, a user needed to schedule in advance a time when both users would connect to the Internet. At the appointed time, the first user would connect to the Internet to publish their dynamic address using an Internet address location service. The second user would then connect and use the same address location service to lookup the network address of the first user. Alternatively, after connecting to the Internet the first user may manually lookup their temporary network address and communicate it to the second user. Assuming both users are simultaneously connected, the two remote users could then establish a peer-to-peer connection. Comparable to trying to meet someone at an airport, this process is complicated, frustrating and unpredictable.

Difficulty in establishing peer-to-peer communication stems from using dynamic network addresses when connecting to the Internet. Many remote computer users gain access to the Internet through either of the following two means: (1) through a telephone dial-up connection provided by a local Internet service provider that dynamically assigns network addresses, or (2) through a local area network having a limited number of permanent Internet addresses and which dynamically assigns Internet network addresses to requesting local users. Predetermined methods for establishing peer-to-peer connections are thus inhibited by dynamic network addresses and temporary network connections.

Current communication methods also do not exploit cost efficiencies associated with using the Internet to eliminate the cost of a long distance phone call. For instance, unattended, automated file exchanges between remote users can be done cheaply using the Internet. However, two problems must be overcome. First, it can be problematic when a remote user of a receiving computer is not connected to the Internet when the user of the originating computer desires to establish communication. Maintaining a continuous connection to the Internet by a remote computer can be very expensive as costs accrue based on connection time. Second, establishing an immediate connection requires that a remote user of the receiving computer be present at the time communication is established.

Accordingly, a need exists for a simple automated method and apparatus for establishing peer-to-peer communication between remote computers over the Internet or other network channels. Establishing a connection should overcome any limitations caused by dynamic network addressing and temporary network connections. The receiving computer should monitor a second monitor channel. The originating computer can then initiate the connection process by sending a message along the monitoring channel, and thus minimize overall transaction costs associated with maintaining a continuous connection to either the monitor or network channel. It is further desirable that this method establish communication without any intervention by the remote user of the receiving computer.

SUMMARY OF THE INVENTION

The present invention is a computer-implemented method of establishing peer-to-peer communication between two remote computing units over a network channel. An originating computer sends a message over a monitor channel to a receiving computer, and the receiving computer monitors the monitor channel. A triggering event is generated in response to at least one of the sending a message or the monitoring. The originating computer and/or the receiving computer, if necessary, will connect to the network channel. In response to the triggering event, either the originating computer or the receiving computer determines a network address associated with either the originating computer or the receiving computer. Using the network address, peer-to-peer communication between the originating computer and receiving computer is established over the network channel.

Various hardware configurations for either computer, with respect to the network channel, can be accommodated by this method for establishing peer-to-peer communication. In addition, determining the network address and establishing communication may be initiated, with or without the use of an address location service, by either computer.

The invention also provides an apparatus for supporting peer-to-peer communication over a network channel. The apparatus includes a call origination module for sending a message over a monitor channel. The call origination module is coupled to a first handler module for establishing communication. A monitor module, monitoring the monitor channel, is also coupled to a second handler module for establishing communication. A memory accessible by at least one of the handler modules is used for storing information indicative of the network address of at least one of the handler modules, and in response to the triggering message, another module, associated with either handler module, is used for accessing the memory, determining a network address and establishing the communication link.

BRIEF DESCRIPTION OF THE DRAWINGS

Additional advantages and features of the present invention will become apparent to those skilled in the art upon reading the following detailed description and upon reference to the drawings in which.

DETAILED DESCRIPTION OF THE PREFERRED EMBODIMENTS

Figure 1:
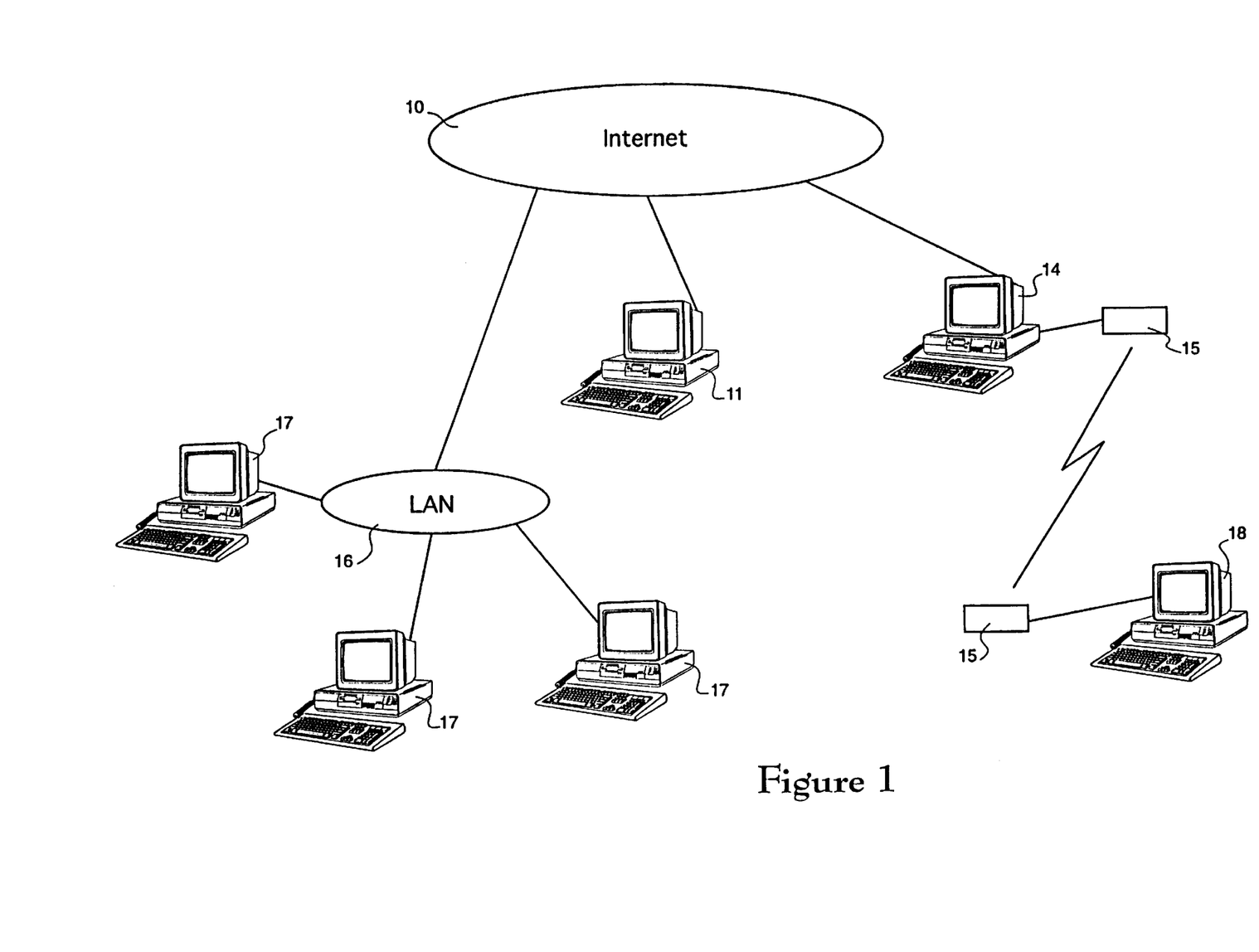
FIG. 1 is a diagram showing suitable configurations for system components to support peer-to-peer communication across a network channel.

The following description of the preferred embodiment is merely exemplary in nature and is in no way intended to limit the invention or its application or its uses. FIG. 1 shows suitable system components to support peer-to-peer communication across a network channel 10. In the present invention, the Internet is being used as a network channel 10. The Internet is a vast collection of inter-connected networks that primarily use the TCP/IP protocol to communicate and a packet switched media to transmit messages. The inter-connected networks individually may consist of Ethernet network systems, Token Ring network systems or other network configurations.

Remote computers utilize the network 10 to establish communication links. A remote computer may access the network channel 10 in a variety of ways. As best seen in FIG. 1, a remote computer 11 may have a direct physical connection 12 to the network channel 10; the physical connection 12 refers to a twisted wire pairs, coaxial cable or optical fibers as its physical media which interconnects a remote computer 11 to the network channel 10. In addition, a remote computer 17 may access the network channel 10 through a local area network (LAN) 16. A LAN 16 may support one or more remote computers 17 which may outnumber the one or more direct physical connections 12 between the LAN 16 and the network channel 10. Upon requests by local computers 17, the LAN 16 will dynamically assign addresses to local computers 17 for accessing the network channel 10.

Alternatively, a remote computer 18 may access the network channel 10 through an Internet service provider 14. Although the Internet service provider 14 is shown as a single computer, it also may consist of a network configuration. The remote computer 18 may establish communication with the Internet service provider 14 by sending messages using modems 15 over the telephone system. The various configurations shown for remote computers may apply to either originating units or receiving units as discussed in the present invention. Those skilled in the art will appreciate that a variety of means can be used for accessing a variety of different network configurations.

Figure 2:
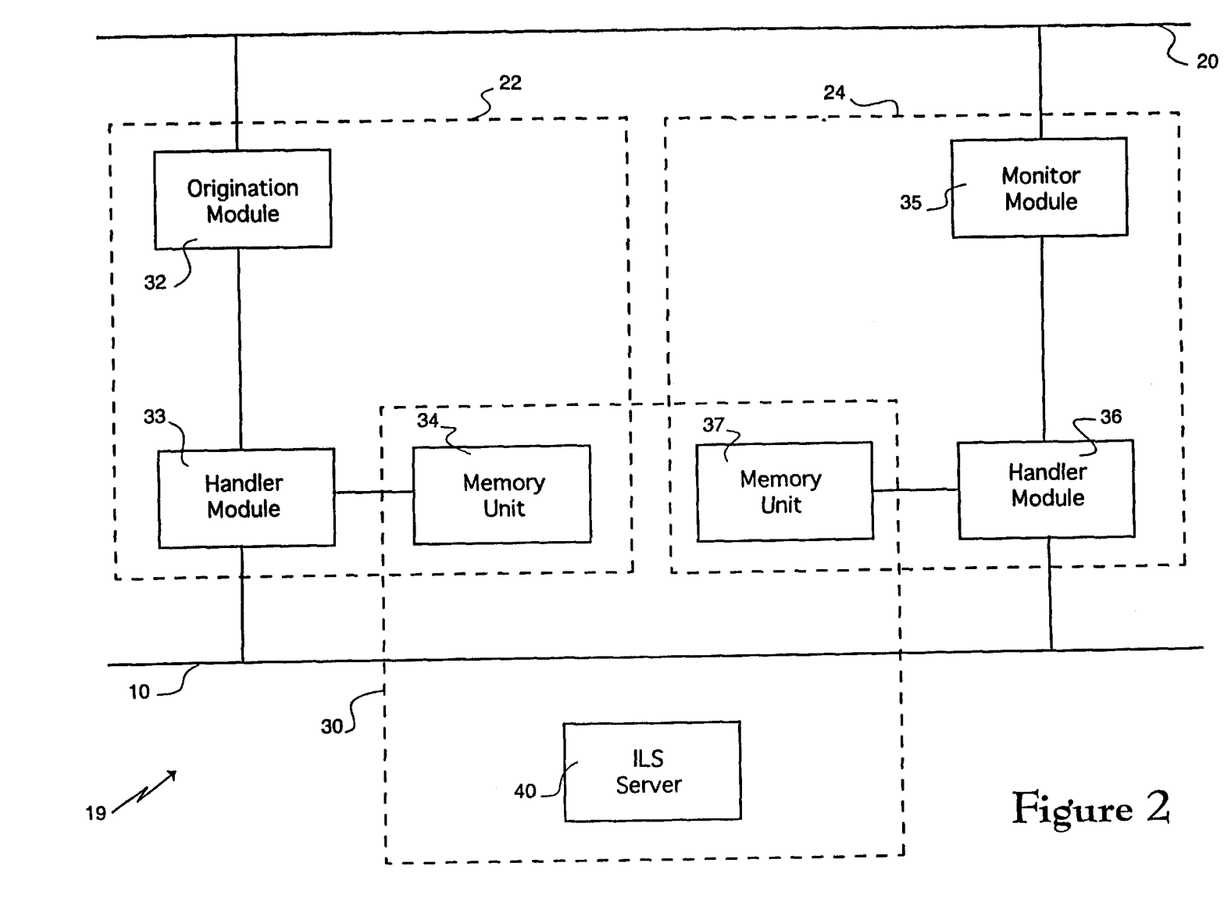
FIG. 2 illustrates the components of the apparatus in the present invention.

An apparatus 19 for supporting peer-to-peer communication over the network channel 10 in the present invention is shown in FIG. 2. The apparatus 19 includes an originating unit 22, a receiving unit 24, a network channel 10, and a monitor channel 20. More particularly, the originating unit 22 comprises a call origination module 32 which is coupled to a first handler module 33. The receiving unit 24 comprises a monitor module 35 which is coupled to a second handler module 36. The first handler module 33 and second handler module 36, each have access to a memory unit 34 and 37, respectively, and can establish communication with network channel 10. In addition, a third memory unit 40, such as an address locater service, is coupled to network channel 10 and is accessible by either of the first handler module 33 or the second handler module 36. Collectively, the memory units comprise a peer-to-peer rule set 30 used by the apparatus 19 to determine the network address of at least one of the said first handler module 33 and second handler module 36.

Figure 3:
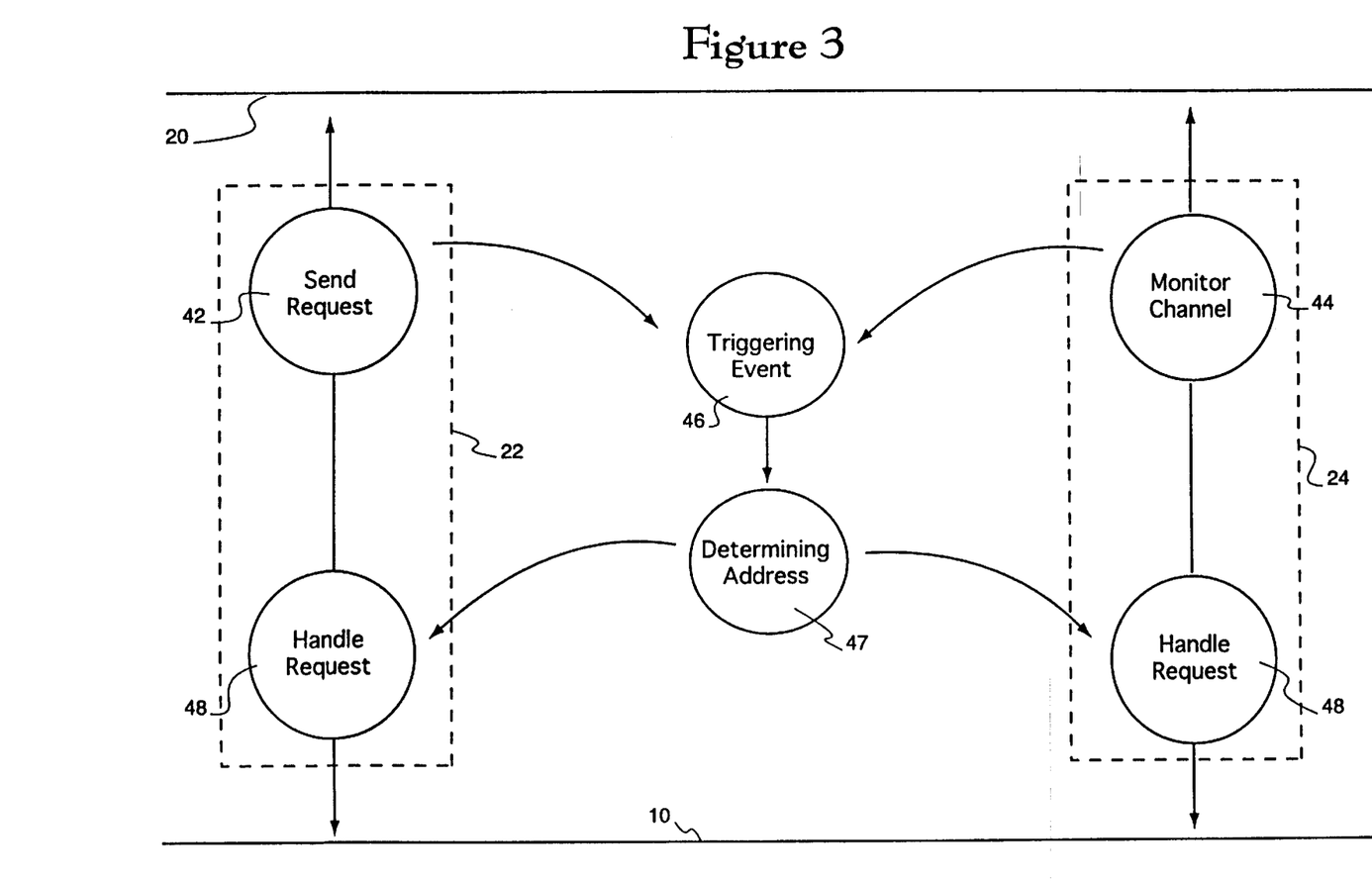
FIG. 3 is block diagram showing the principle functions of the present invention.

Primary events for establishing peer-to-peer communication between two remote computing units over a network channel 10 are illustrated in FIG. 3. First, a message 42 is sent by the originating unit 22 to the receiving unit 24 over a monitor channel 20. By continuous monitoring of the monitor channel 20, a message 44 is received by the receiving unit 24. In response to either sending message 42 or the monitoring message 44, a triggering event 46 is generated. In response to the triggering event 46, either the originating unit 22 or receiving unit 24 will determine information 47 indicative of a network address associated with either the originating unit 22 or receiving unit 24. Subsequently, both of the originating unit 22 and receiving unit 24 will handle a message 48 to establish communication between the originating unit 22 and the receiving unit 24 over the network channel 10.

Figure 4:
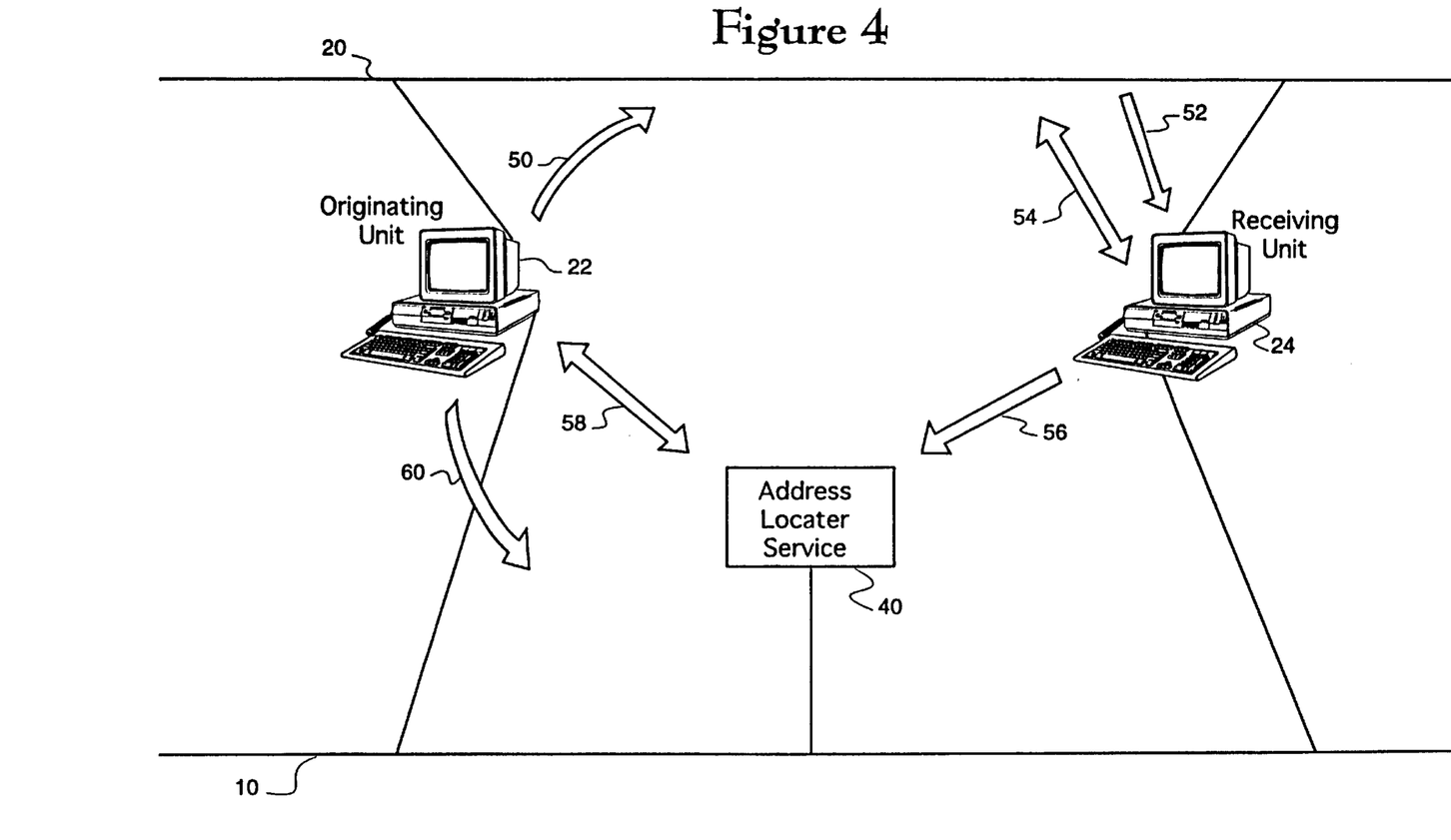
FIG. 4 is a functional diagram showing the steps for establishing peer-to-peer communication using the dynamic network address of the receiving unit in the present invention.

More particularly, FIG. 4 shows a functional diagram of the steps for establishing peer-to-peer communication using the dynamic network address of the receiving unit 24. First, the originating unit 22 sends a message 50 to the receiving unit 24 over the monitor channel 20. The monitor channel 20 can be a channel reachable at any time and will most likely consist of a bounded communication media such as a circuit switched communication pathway used in a telephone system. In addition, a unbounded communication media, such as high-frequency radio transmissions, microwave transmissions, cellular radio transmissions or satellite transmissions, may also be used as a monitor channel 20. Those skilled in the art will appreciate that a variety of transmission channels can be utilized as a monitor channel 20. In the case of bounded communication media, a physical connection between the originating unit 22 and the monitoring channel 20 may need to be established in order to send the message 50.

By monitoring the monitor channel 20, the receiving unit 24 must differentiate between different incoming transmissions. Since the monitor channel 20 may serve multiple purposes, the receiving unit 24 will distinguish between a message transmitted from an originating unit 22 desirous of establishing communication and an ordinary telephone call or a facsimile transmission from the originating unit 22 or a different remote unit. Upon receiving a request to establish communication, the receiving unit 24 may react to the message in either of two ways.

First, the receiving unit 24 may respond to 54 the transmitted message by exchanging information with the originating unit. A physical connection may need to be established in order to respond 54 over the monitor channel 20. In this example, an indicator of the originating unit's 22 willingness to establish communication and the identity of the originating unit may be passed to the receiving unit 24. During the information exchange, the receiving unit 22 may also conduct a verification/security check to ensure that the originating unit 22 is an authorized participant. As will be apparent to one skilled in the art, additional information related to this peer-to-peer communication transaction may also be exchanged. Upon completion of the information exchange, any physical connections between the originating unit 22 and the monitor channel 20, and the receiving unit 24 and the monitor channel 20 can be disconnected.

Secondly, the receiving unit 24 may only receive 52 the transmitted message. Receiving 52 the message does not require a two-way exchange of information between the originating unit 22 and the receiving unit 24. For example, a paging device or caller identification services used in the telephone system allows the recipient of the message to identify the sender (by telephone number) without responding to message; these two identification means or some similar means could also be used by the receiving unit 24 to identify the originating unit 22. Unlike the above described information exchange, the originating unit 22 assumes that the message has been received and that there is a willingness to establish a connection. Likewise, the receiving unit 24 infers from the message the originating unit's 22 willingness to establish a connection. Similar to the originating unit 22, a physical connection by the receiving unit 24 to the monitor channel 20 may be needed when a bounded communication media is used for the monitor channel 20.

Next, the transmitted message triggers the receiving unit 24 to publish 56 its network address using an address locater service 40 found on the network channel 10. An IP address may be used to publish the network address of the receiving computer when the Internet is used as the network channel 10. The receiving unit 24 may need to establish a physical connection to the network channel 10 before executing this event and may need to use the same physical means as used by the monitor channel 20, such as a telephone line, to establish a connection. Correspondingly, upon sending the message or upon completing an information exchange, the originating unit 22 is also triggered to access the address location service 40 on the network channel 10. Once the receiving unit 24 has published 56 its IP address, then the originating unit 22 can retrieve 58 this IP address based on the identity of the receiving unit 24. The identity of the receiving unit 24 may be signified by its telephone number or some other information which is known by the originating unit 22 prior to transmitting the initial message or it may have been obtained during the exchange of messages on the monitor channel 20.

Finally, in response to these triggering events, the originating unit 22 establishes communication 60 between the originating unit 22 and the receiving unit 24 over the network channel 10 by using the retrieved network address of the receiving unit 24. Once the two units have established a communication link across the network channel 10, the two remote users can conduct a conversation, exchange files, participate in real-time gaming or any other peer-to-peer activity. At the completion of their communication session, the originating unit 22 and receiving unit 24 can be disconnected to minimize transaction costs associated with accessing the network channel 10.

Figure 5:
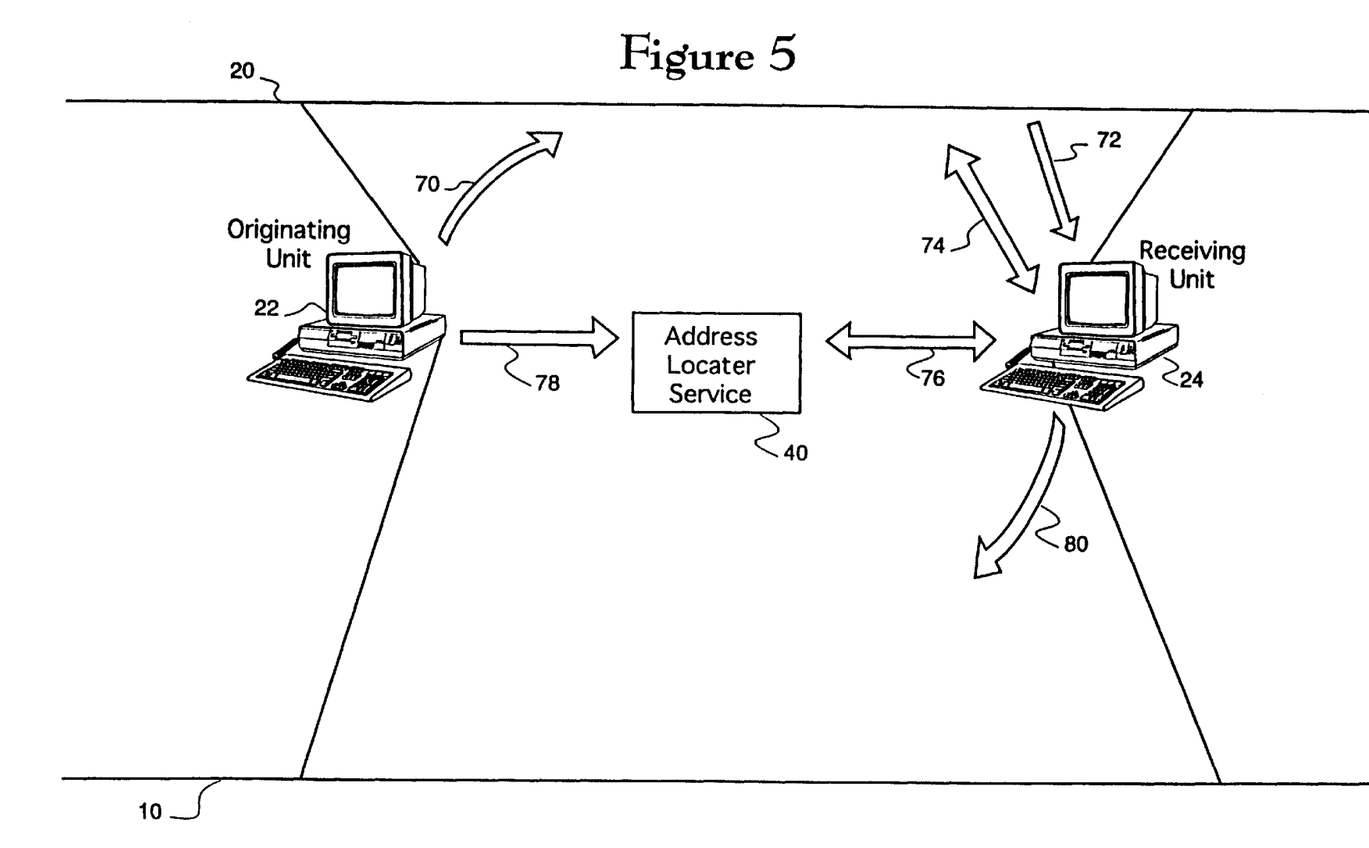
FIG. 5 is a functional diagram showing the steps for establishing peer-to-peer communication using the dynamic network address of the originating unit in the present invention.

Similarly, FIG. 5 shows a functional diagram of the steps for establishing peer-to-peer communication, but uses the dynamic network address of the originating unit 22 to establish communication. First, the originating unit 22 sends a message 70 to the receiving unit 24 over the monitor channel 20. The receiving unit 24 will be monitoring the monitor channel 20, and thus react to the transmitted message. The receiving unit 24 may only receive 72 the transmitted message or it may respond to 74 the message by exchanging information with the originating unit 22 over the monitor channel 20. Those skilled in the art will appreciate that these initial steps are the same as seen above, and thus various changes, modifications and variations as previously described are also applicable.

By transmitting the message, the originating unit 22 is triggered to access the network channel 10 and publish 78 its network address using an address location service 40. Correspondingly, the receiving unit 24 is also triggered to access the address location service 40. After the originating unit 22 has published its network address, the receiving unit 24 can retrieve 76 this network address based on the identity of the originating unit 22. The identity of the originating unit 22 may be signified by its telephone number or some other information ascertained from the transmitted message.

Figure 6:
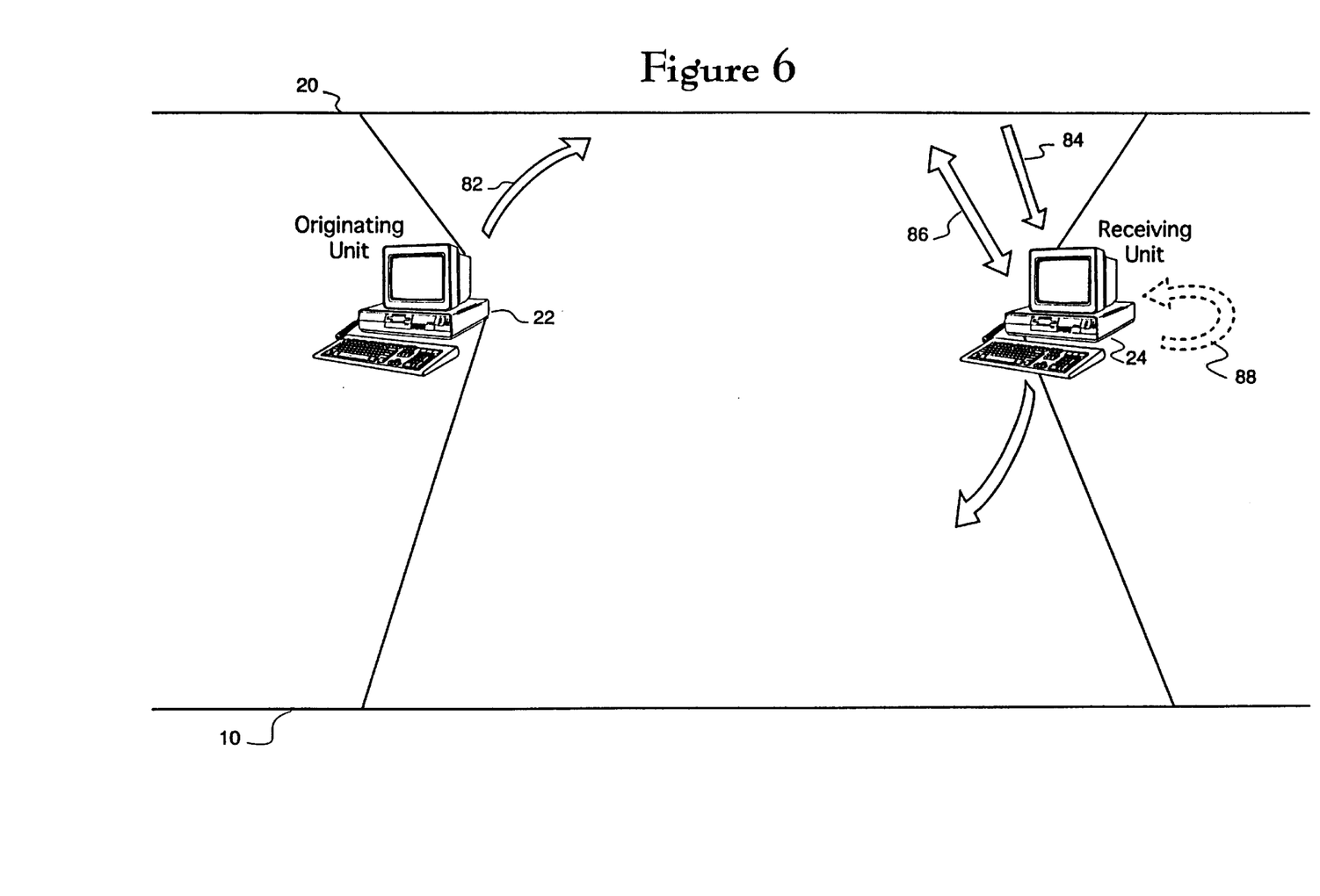
FIG. 6 is a functional diagram showing the steps for establishing peer-to-peer communication using the permanent network address of the originating unit in the present invention.

Another variation in the steps for establishing peer-to-peer communication using the network address of the originating unit 22 is illustrated in FIG. 6. A communication link may be established without the use of an address location service. For instance, the originating unit 22 connects to the network channel 10, and thus establishes its dynamic network address before transmitting a message to the receiving unit 24. The originating unit 22 can then send 82 the receiving unit 24 its network address. The receiving unit 24 will respond to 86 the message and establish 90 peer-to-peer communication over the network channel 10 using the transmitted network address of the originating unit 22. As will be apparent to one skilled in the art, if the originating unit 22 has a permanent network address, then its network address can be transmitted without having to connect to the network channel 10.

Alternatively, when the originating unit 22 has a permanent network address, only the identity of the originating unit 22 could be sent to 82 the receiving unit 24 for establishing peer-to-peer communication. Upon receiving 84 the identity of the originating unit 22, the apparent to one skilled in the art, if the originating unit 22 has a permanent network address, then its network address can be transmitted without having to connect to the network channel 10.

Alternatively, when the originating unit 22 has a permanent network address, only the identity of the originating unit 22 could be sent to 82 the receiving unit 24 for establishing peer-to-peer communication. Upon receiving 84 the identity of the originating unit 22, the receiving unit 24 is triggered to determine 88 the originating unit's 22 permanent network address. For example, the receiving unit 24 may have internal access to memory which maps telephone numbers to network addresses, and therefore can determine the network address for originating unit 22 which has sent the triggering message.

In response to the above trigger events, the receiving unit 24 has determined the network address for originating unit 22. The remaining step, as shown in both FIG. 5 and FIG. 6, involve the receiving unit 24 establishing communication 80 and 90, respectively, between the originating unit 22 and the receiving unit 24 over the network channel 10 by using the network address for the originating unit 22. As will be apparent to one skilled in the art, various means exist for determining and exchanging the network address for either the originating unit 22 or receiving unit 24 in the present invention.

Figure 7:
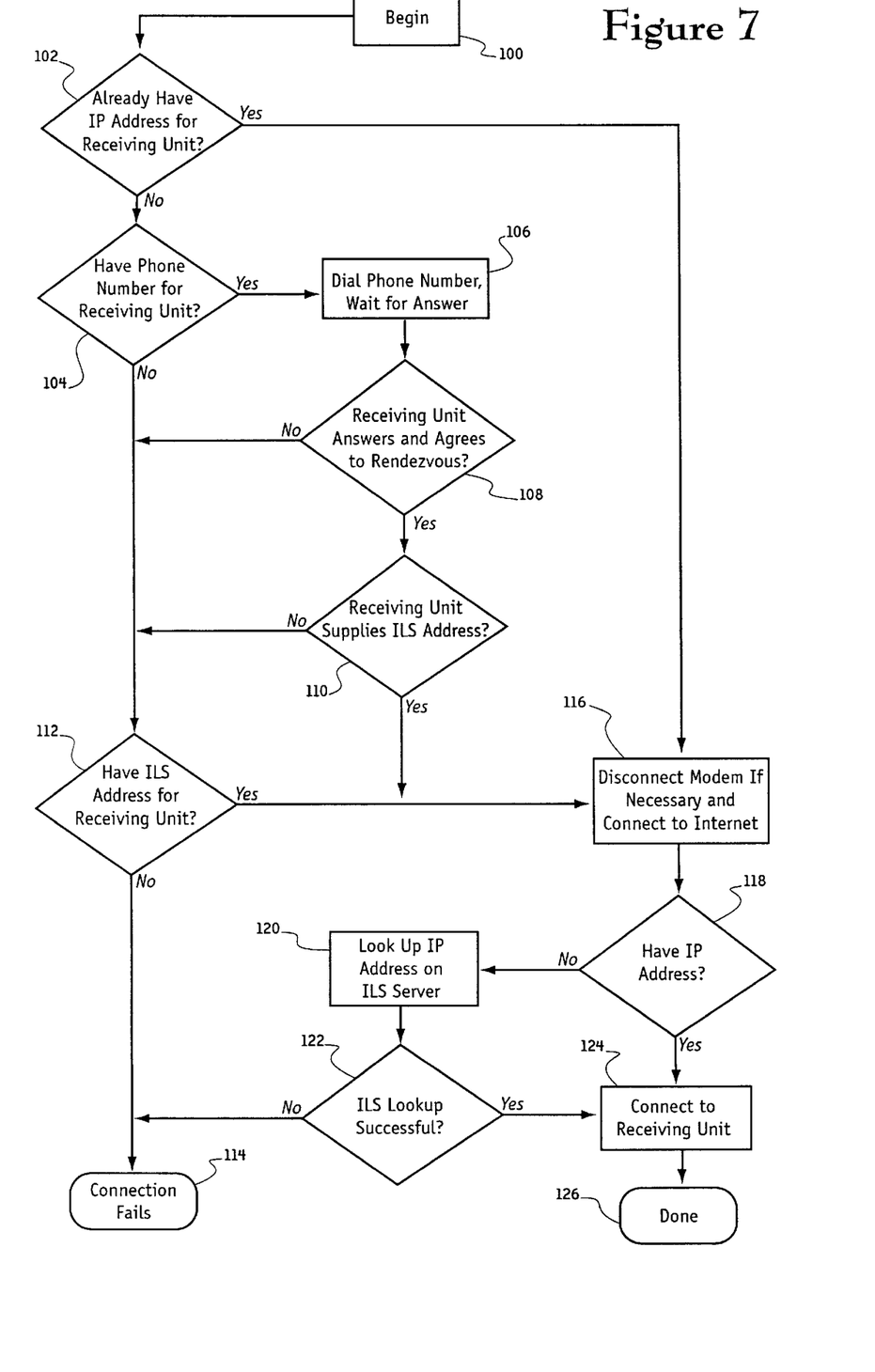
FIG. 7 is a flow chart which depicts the steps for establishing peer-to-peer communication for an originating module in the present invention.

FIG. 7 is flowchart depicting an embodiment of the procedures encapsulated in the originating unit in the present invention (see Appendix A for an example of pseudo code used in the originating unit). For the preferred embodiment, the user of the originating module indicates a remote recipient computer for establishing a communication link. In this embodiment, the originating and receiving units have dial-up connections to the network channel and the originating unit is not connected to the network channel when the process is initiated. Start block 100 signifies the users request to initiate a communication session, and begins processing with block 102. Decision block 102 begins the inquiry into what connection means will be used by the originating module to connect to the receiving module. If decision block 102 determines that originating module has an IP address for the receiving module, then processing continues at block 116. However, if decision block 102 determines that it does not have an IP address, then decision block 104 will determine whether the originating unit has a telephone number that can be used to reach the receiving unit.

If the originating unit does not have a telephone number, then processing continues at block 112. On the other hand, if the originating unit does have a telephone number, then in block 106, originating unit will dial the telephone number and wait for an answer from receiving unit. Block 106 continues the process in block 108. Decision block 108 determines if the receiving unit has answered the telephone and is willing to establish a connection with the originating unit. If so, proceed to block 110; but otherwise, if the receiving unit fails to answers the telephone or is unwilling to connect, then processing continues at block 122.

Decision block 110 determines whether receiving unit has supplied its ILS address to originating unit. If the receiving unit has supplied its ILS address, then processing continues in block 116. However, without receiving the ILS address, block 112 determines if originating unit already has a ILS address for the receiving unit. If decision block 112 determines that it does have a ILS address, then processing proceeds to block 116. Without a ILS address, the originating unit has failed to identify a means for connecting the receiving unit, thus ending processing in block 114.

In block 116, originating unit disconnects its modem connection, if necessary, and connects to the network channel. Block 116 continues the connection process in block 118. If originating unit has an IP address, then processing continues in block 124. On the other hand, without an IP address, then the originating unit will perform a look up of the IP address for the receiving unit on a ILS server in block 120. Failure to obtain an IP address signifies a failure to connect, and thus ending the procedure in block 114. However, a successful look up results in an IP address that can be used to establish a connection in block 124. Block 124 establishes a connection from the originating unit to the receiving unit using the IP address, and thus completing the process in block 126.

Figure 8:
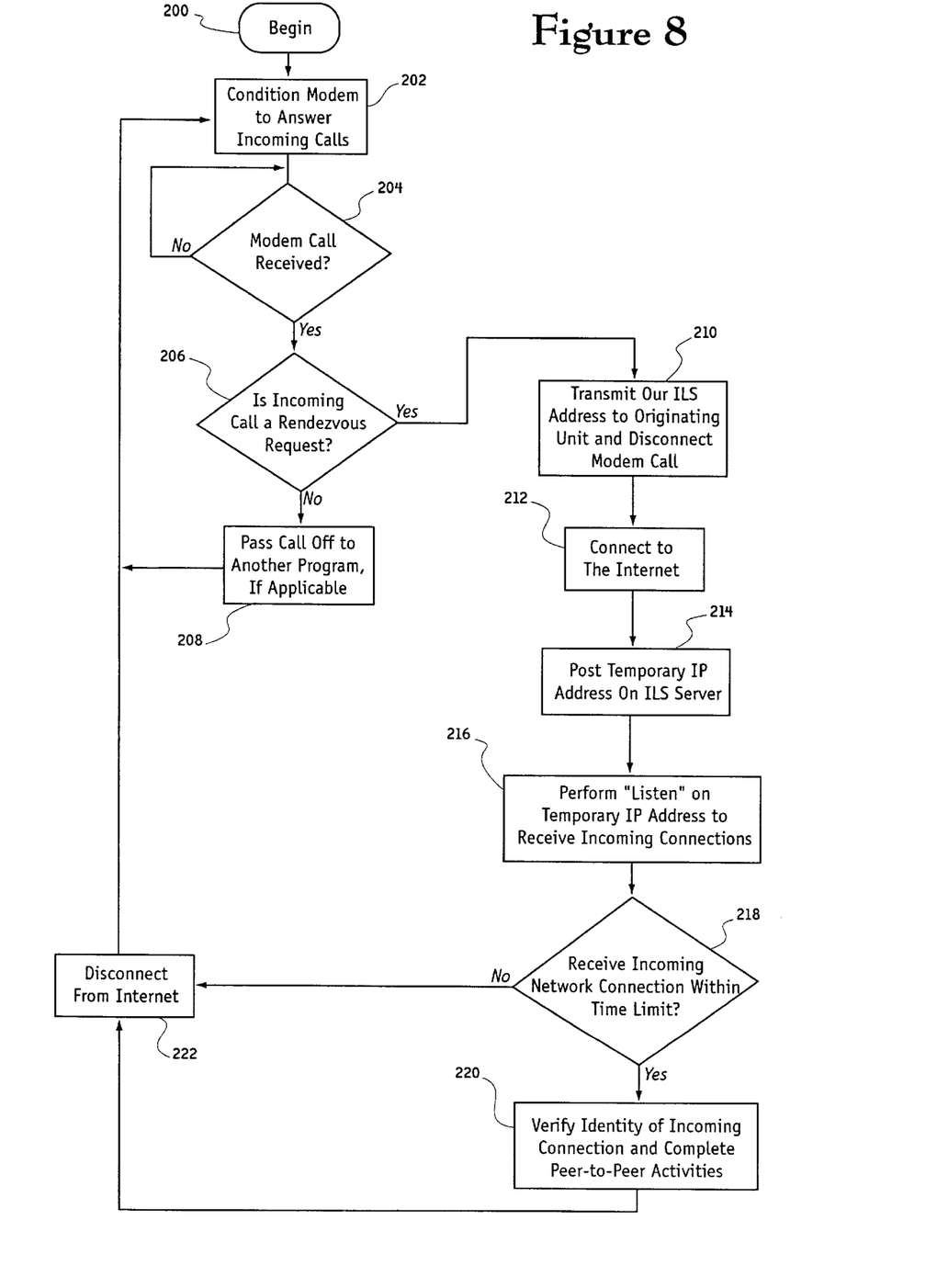
FIG. 8 is a flow chart which depicts the steps for establishing peer-to-peer communication for a receiving module in the present invention.

A flow chart showing an embodiment of the procedures encapsulated in the receiving module can be seen in FIG. 8. In this embodiment, the receiving unit utilizes the same modem to connect to the monitor channel and the network channel. Start block 200 begins processing in block 202. In block 202, the receiving unit conditions its modem for answering incoming calls. Decision block 204 then awaits for incoming calls. Once the receiving unit receives a call, then decision block 206 determines if the call is a request to establish a connection. For a request to establish a connection, processing continues in block 210. In block 208, other types of calls are passed off to other application programs, if applicable, and processing is returned to block 202.

Upon receiving a request to connect, the receiving unit transmits its ILS address to the originating unit and disconnects its modem call in block 210. Receiving unit continues processing in block 212 by establishing a physical Internet connection and in block 214 by temporarily posting its IP address on a ILS server. Proceeding to block 216, the receiving unit then performs a "listening" function for receiving incoming requests to establish a connection. Decision block 218 determines whether the incoming request is received within a specified time limit. In block 220, the receiving unit verifies the identity of a timely request and establishes peer-to-peer connection. Upon completion of the communication session, processing continues at block 220. Untimely requests proceed to block 202.

Block 222 disconnects receiving unit from network channel. Processing is then returned to block 202 to recondition modem in anticipation of subsequent incoming calls.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

APPENDIX A

Currently on Internet
Have permanent Internet address for destination
Connect directly via permanent IP addr.
Have ILS address for destination (but no permanent IP)
Destination currently logged onto ILS server
Look up dynamic IP and connect
Destination not currently logged onto ILS server
Have phone number
Not using modem for Internet connection
Initiate Internet Rendezvous
Using modem for Internet connection
User agrees to break connection
Disconnect then initiate Internet Rendezvous
User doesn't agree to break connection
Can't connect: destination not on ILS
(or queue for later connection)
Don't have phone number
Can't connect: destination not on ILS
Have phone number for destination (but no ILS or permanent IP)
Not using modem for Internet connection
Initiate Internet Rendezvous
Using modem for Internet connection
User agrees to break connection
Disconnect then initiate Internet Rendezvous
User doesn't agree to break connection
Can't connect now
(or queue for later connection)
Not currently on Internet
Have permanent IP for destination
Connect directly to IP (RAS will dial if needed)
Have phone number for destination
User chose connect with rendezvous
Dial via modem and host answers
Have ILS or host supplies ILS or IP address
Hang-up and connect through ILS (RAS will dial)
Doesn't supply ILS or IP address
Stay on-line via modem
Dial via modem but host is busy or doesn't answer
Keep retrying with user option to try on Internet
User chose connect without rendezvous
Have ILS address
Connect to ILS server (RAS will dial)
Don't have ILS or IP
Error: can't connect without rendezvous
Have ILS address for destination (but no phone number and no IP addr.)
Connect to ILS service (RAS will dial) and try to connect

What is claimed is:

1. A method of establishing a peer-to-peer communication between an originating unit and a receiving unit over a network channel that identifies communicating units by network address, comprising the steps of:

sending a message from said originating unit to said receiving unit over a monitor channel;

monitoring a monitor channel by said receiving unit;

determining information indicative of the identity of at least one of said originating unit and said receiving unit;

generating a trigger event in response to at least one of said sending and monitoring steps, wherein said trigger event includes connecting at least one of said originating unit and said receiving unit to said network channel, thereby establishing a first network address for at least one of said originating unit and said receiving unit, and determining said first network address by the other of said originating unit or said receiving unit using the information indicative of the identity of at least one of said originating unit and said receiving unit; and in response to said triggering event, establishing communication between said originating unit and said receiving unit over said network channel using said first network address.

2. The method according to claim 1 further comprising the steps of:

initiating communication for sending said message over said monitor channel by said originating unit; and terminating communication after sending said message over said monitor channel by said originating unit.

3. The method according to claim 1 further comprising the steps of:

responding to said message by initiating communication over said monitor channel by said receiving unit;

exchanging information indicative of a first network address between said originating unit and said receiving unit over said monitor channel; and terminating communication over said monitor channel by said receiving unit.

4. The method according to claim 1 wherein said first network address associated with at least one of said originating unit and said receiving unit is determined using the identity of at least one of said originating unit and said receiving unit and an address locator service.

5. The method according to claim 4 wherein said originating unit determines said first network address for said receiving unit by using said identity of said originating unit and an address locator service, where said address locator service is found on said network channel and can be accessed by said originating unit.

6. The method according to claim 4 wherein said receiving unit determines said first network address for said originating unit by using said identity of said originating unit and an address locator service, where said address locator service is found on said network channel and can be accessed by said receiving unit.

7. The method according to claim 1 wherein said message is indicative of the identity of said originating unit and said receiving unit determines said first network address by using said identity of said originating unit and a stored rule set.

8. The method according to claim 1 wherein said monitor channel is based upon a circuit switched communication medium.

9. The method according to claim 1 wherein said monitor channel is based upon an unbounded communication medium.

10. The method according to claim 1 wherein said network channel is based upon a packet switched communication medium.

11. An apparatus for supporting peer-to-peer communication over a network channel that identifies communicating units by network address, said apparatus using a monitor channel, comprising:

a monitor module connected to said monitor channel;

a first network communication handler coupled to said monitor module for establishing communication with said network channel;

an origination module for sending a message to said monitor module over said monitor channel, where said origination module is operative to initiate communication with said monitor module over said monitor channel;

a second network communication handler coupled to said origination module for establishing communication with said network channel;

a memory accessible by at least one of said first and second network communication handlers for storing information indicative of a first network address associated with at least one of said first and second network communication handlers; and at least one of said first and second network communication handlers responsive to at least one of said monitor module and said origination module for accessing said memory, thereby determining said first network address, and establishing communication between said first and second network communication handlers over said network channel using said first network address.

12. The apparatus of claim 11 further comprising a connection between said origination module and said monitor channel.

13. The apparatus of claim 11 further comprising a connection between said monitor module and said monitor channel.

14. The apparatus of claim 11 further comprising a connection between said first network communication handler and said network channel.

15. The apparatus of claim 11 further comprising a connection between said second network communication handler and said network channel.

16. The apparatus of claim 11 wherein said monitor channel is based on a circuit switched communication media.

17. The apparatus of claim 11 wherein said monitor channel is based on an unbounded communication media.

18. The apparatus of claim 11 wherein said network channel is based on a packet switched communication media.

19. A method of establishing a peer-to-peer communication between an originating unit and a receiving unit, comprising the steps of:

providing a network channel that identifies communicating units by dynamic network addressing;

connecting said originating unit to said network channel, thereby establishing a first network address for said originating unit;

sending a message from said originating unit to said receiving unit over a monitor channel, wherein said first network address is transmitted via said message to said receiving unit by said originating unit;

monitoring a monitor channel by said receiving unit;

receiving said message by said receiving unit; and establishing communication between said originating unit and said receiving unit over said network channel using said first network address.

* * * * *